Dec. 4, 1923.  1,476,066
A. R. FORS
MACHINE FOR MILLING RODS
Filed Aug. 30, 1920     3 Sheets-Sheet 1

INVENTOR
ARTHUR R. FORS
BY Albert C. Bell
ATTORNEY

Dec. 4, 1923.

A. R. FORS 1,476,066

MACHINE FOR MILLING RODS

Filed Aug. 30, 1920

INVENTOR
ARTHUR R. FORS
BY
Albert C. Bell
ATTORNEY

Patented Dec. 4, 1923.

1,476,066

UNITED STATES PATENT OFFICE.

ARTHUR R. FORS, OF DETROIT, MICHIGAN, ASSIGNOR TO CONTINENTAL MOTORS CORPORATION, OF DETROIT, MICHIGAN, A CORPORATION OF VIRGINIA.

MACHINE FOR MILLING RODS.

Application filed August 30, 1920. Serial No. 406,917.

*To all whom it may concern:*

Be it known that I, ARTHUR R. FORS, a citizen of the United States, residing at Detroit, in the county of Wayne and State of Michigan, have invented a new and useful Improvement in Machines for Milling Rods, of which the following is a specification.

My invention relates to an improved machine for milling rods or similar objects and more specifically for milling one or both sides of the ends of rods in a continuous operation so that blanks may be inserted by the operator while the machine is running and carried by a rotatable head or turret past the milling cutter or cutters in a continuous operation, the said rods or other objects being automatically clamped in position before the milling operation and released after the milling operation so that the milled rods or objects may drop from the machine or be removed therefrom by the operator.

My invention will be best understood by reference to the accompanying drawings showing a preferred embodiment thereof in which.

Figure 7:
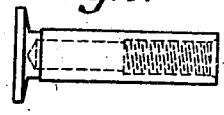
Figure 8:
Figure 9:
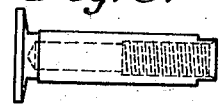
Figure 10:

Figs. 7 and 8 are side and end views respectively of a blank to be milled in the machine and Figs. 9 and 10 are side and end views respectively of the blank shown in Figs. 7 and 8 after being milled by the machine.

Similar numerals refer to similar parts throughout the several views.

Figure 1:
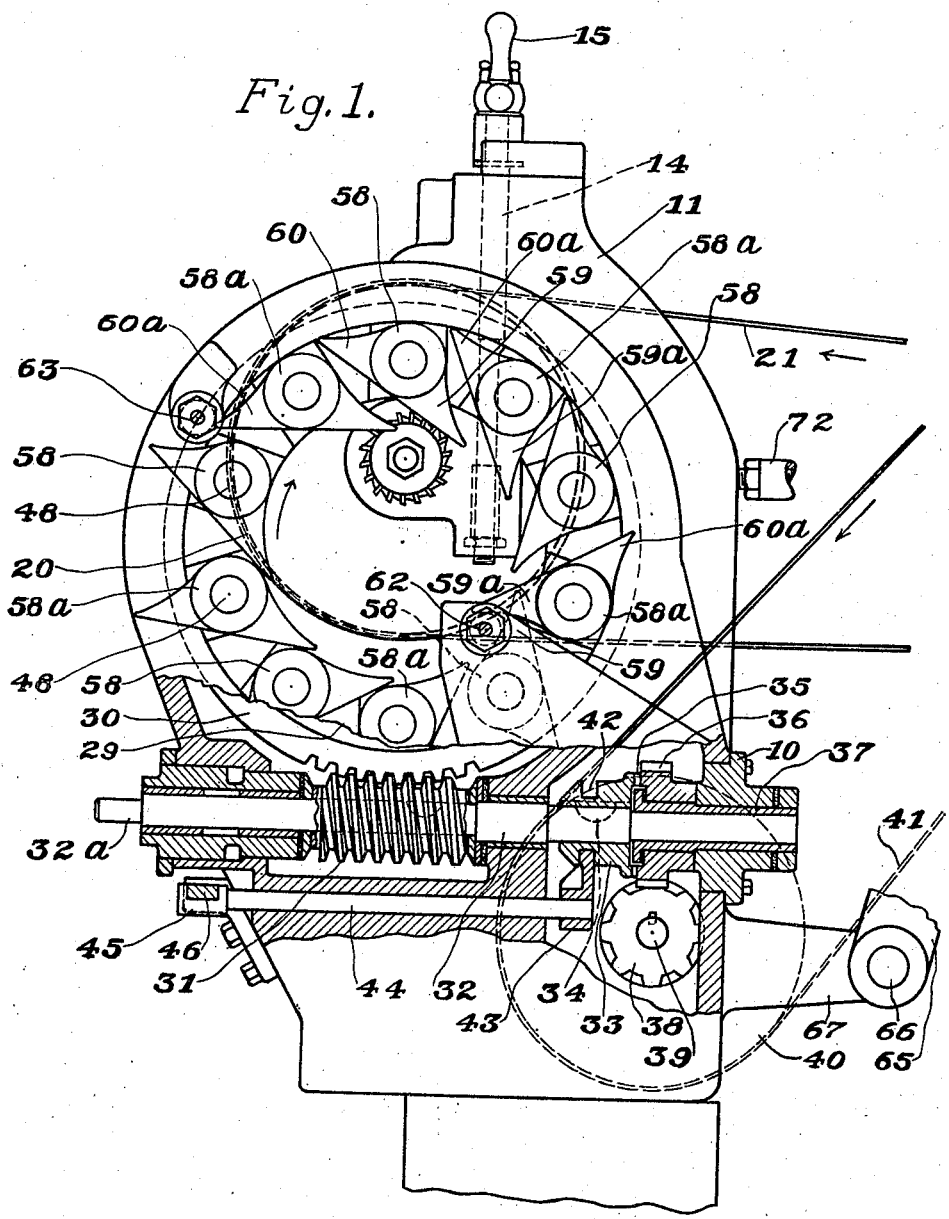
Fig. 1 is an end elevation of the machine, partially in section to show some of the driving mechanism.
Figure 2:
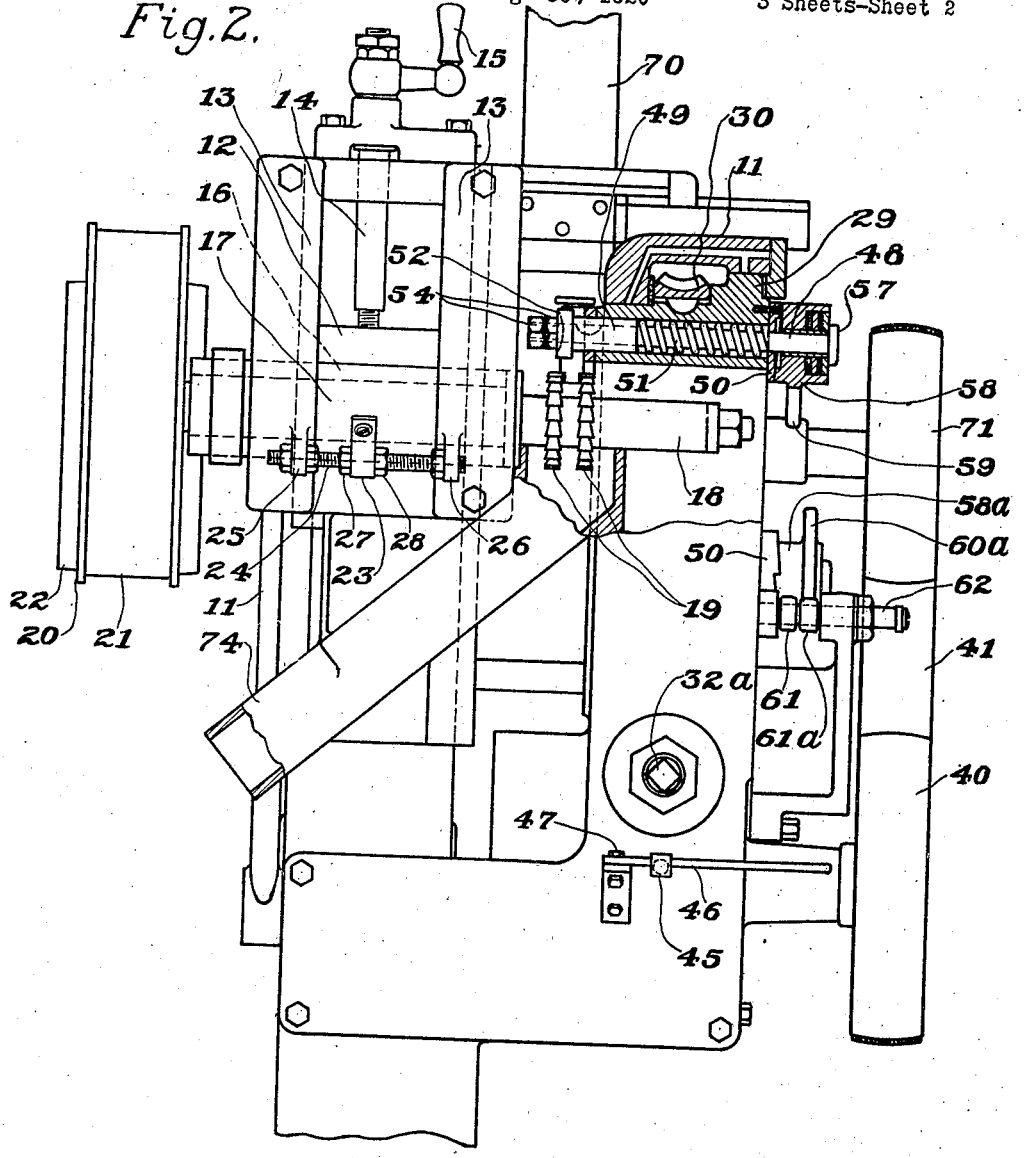
Fig. 2 is a front elevation of the machine partially in section to show the construction of the clamping mechanism.

As shown in Figs. 1 and 2 the machine consists of a housing 11 in which a head 12 is mounted to move vertically in suitable guideways 13 by means of a feed screw 14 to the upper end of which an operating handle 15 is secured. The head 14 carries in suitable horizontal guides 16 a sleeve 17 which carries a horizontal spindle 18 on one end of which the milling cutter or cutters 19 are mounted and on the other end of which a pulley 20 is secured to be driven by means of a suitable belt 21 from a pulley 22. The sleeve 17 has projecting therefrom a lug 23 through which a horizontal, threaded rod 24 extends, said rod being supported at its ends by lugs 25 and 26 carried by the housing and having thereon adjusting nuts 27 and 28 by turning which the sleeve 17 and the spindle 18 may be moved longitudinally of the spindle to adjust the milling cutters 19 in a horizontal direction, vertical adjustment of said cutters being accomplished by operation of the screw 14.

The housing 11 is given an annular formation around the right hand end of the spindle 18 as shown in Fig. 2 and carries on its inner surface a rotatable head or turret 29 in a plane at right angles to the axis of the spindle 18. The head 29 has rigidly secured thereto a worm wheel 30 which as shown in Fig. 1 is engaged by a worm 31 carried by a shaft 32 on which one member 33 of a jaw clutch, is mounted to move longitudinally, rotary motion thereof on said shaft being prevented by a key 34. The clutch member 33 engages a second clutch member 35 rigidly secured to one end of a gear 36 rotatably mounted on a sleeve 37 rigidly supported by the housing 11 which sleeve forms an end support for the shaft 32. The gear 36 is of the skew type and meshes with a similar gear 38 rigidly secured to a shaft 39 to the outer end of which a pulley 40 is secured to be driven by a belt 41. As a result of the construction described, when the pulley 40 is rotated by the motion of the belt 41 in the direction indicated in Fig. 1, and when the clutch members 33 and 35 are in engagement with each other, the head 29 is rotated in the direction indicated by the arrow in Fig. 1.

The clutch member 33 has formed in its outer surface a groove 42 for receiving an operating member 43 carried by the right hand end of a rod 44 as shown in Fig. 1, the opposite end of said rod having secured thereto a block 45 engaged by a lever 46 which, as more clearly shown in Fig. 2 is pivotally supported at 47 by a bracket carried by the housing of the machine so that motion of the lever 46 may move the clutch member 33 from engagement with the clutch member 35 when it is desired to stop rotation of the head 29 and parts carried thereby without stopping the remaining portions of the machine. For this condition, to permit adjusting the machine and trying out the adjustments, the shaft 33 may be rotated by hand by placing a suitable operating handle on the outer squared end 32$^a$ of said shaft and rotating said handle.

Figure 5:
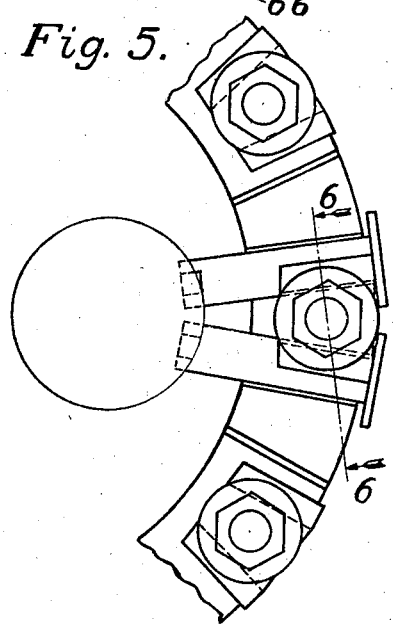
Fig. 5 is a partial end elevation to an enlarged scale of the revolving turret or head used to carry the objects to be milled, this view being taken from the opposite end of the machine from Fig. 1.
Figure 6:
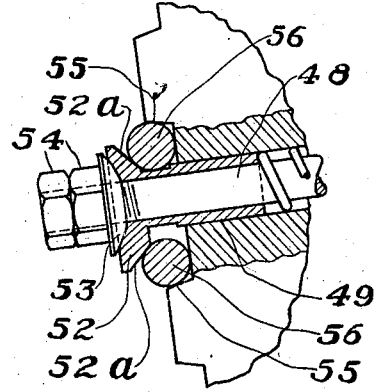
Fig. 6 is a sectional view of the parts shown in Fig. 5 taken along the line 6—6.

The head 29 carries a plurality of equally spaced clamping rods 48 extending horizontally through said head parallel with the axis of the spindle 18 and preferably equidistant from the axis of the head, the axis of said spindle and head being displaced vertically so that the head rotates eccentrically relatively to the spindle 18, the displacement being in such a direction that the upper portion of the head is nearer the spindle than is the lower portion of the head. Each of the rods 48 is constructed and mounted as indicated in Fig. 2 and carries on its inner end a sleeve 49, which is a sliding fit in a corresponding bore in the head formed to receive it, the other end of the spindle being a sliding fit in and supported by a fixed cam plate 40 carried by the head 29. A spring 51 is disposed around the rod 48 between the sleeve 49 and the cam plate 50 to move said rod as far to the left as shown in Fig. 2, which is the releasing position of said rod, as the position of the devices engaging the cam plate 50 will permit. The left hand end of the sleeve 49 as more clearly shown in Fig. 6 is enlarged to form a clamping disk 52 engaged by a washer 53 through which the sleeve and disk are held positively on the rod 48 by lock nuts 54. As more clearly shown in Figs. 5 and 6 opposite edges of the disk 52 are beveled as shown at 52$^a$, the planes of these beveled surfaces extending through the axis of the head 29. The adjacent face of the head carries a plurality of cooperating projections or blocks having beveled edge surfaces 55 such that the rods 56 disposed radially between the surfaces 55 and the surfaces 52$^a$ are rigidly held in said radial position when the rod 48 is forced to the right for the position of the parts shown in Figs. 2 and 6.

In this position, with proper adjustment of the milling cutters 19, the rods 56 lie in a plane perpendicular to the axis of the spindle 18, assuming it is desired to mill the ends of the rods parallel with their axis, the plane of the axis of the rods being displaced from the cutter or cutters an amount depending upon how much it is desired to mill from the sides of the ends of the rods. It will at once appear that where it is desired to mill but one side of the ends of the rods a single cutter 19 may be employed and where it is desired to mill opposite sides of the ends of the rods this may be done in a single operation by using two cutters 19 spaced apart on the spindle 18 by an amount equal to the thickness of the ends of the rods it is desired to leave after the milling operation. The rods 48 are moved to clamping position by the following devices:

The right hand end of each of the rods 48 as shown in Fig. 2 is provided with an enlarged head 57 between which and the cam plate 50, a rotary cam 58 is disposed. The cam 58 is provided with a cam surface adjacent to the cam plate 50 so that rotation of the cam 58 in one direction moves the rod 48 outwardly against the action of the spring 51 to move the disk 52 to its clamping position, while motion of the cam 58 in the reverse direction releases the rod 48 and permits the spring 51 to move the disk 52 to its releasing position. Each of the cams 58 is provided with two projecting cam arms 59 and 60 as more clearly shown in Fig. 1, by which the cams 58 are rotated as the head 29 moves the cams about its axis operating the rods 48 in the manner described. The cams are all of substantially the same construction the only difference being that alternate ones of said cams have their projecting cam arms in one plane while the intermediate cams have their projecting arms in a second plane, displaced sufficiently from the plane of the arms of the alternate cams so that there is no interference between the cam arms when the cams are rotated. To distinguish between the alternate and intermediate cams the alternate cams are designated 58 and their projecting cam arms 59 and 60 while the intermediate cams are designated 58$^a$ and their projecting cam arms are designated 59$^a$ and 60$^a$. The housing 11 carries by means of a suitable bracket, rollers 61 and 61$^a$, rotatably mounted on a stud 62 within the inner radius of the head 29 and in such position that these rollers lie respectively in the paths of the cam arms 59 and 59$^a$. As a result, as the head rotates and each of the cam arms 59 and 59$^a$ engages a corresponding roller 61 or 61$^a$, the corresponding cam is rotated somewhat more than a quarter of a turn and in the direction releasing the corresponding rod 48.

The housing 11 also carries on a stud 63 located outside of the path of the cams 58 and 58$^a$ and nearly opposite to the stud 62, a second pair of rollers similar to the rollers 61 and 61$^a$, for the purpose of similarly engaging the cam arms 60 and 60$^a$, respectively. As the head 29 rotates, the arms 60 and 60$^a$ engage the rollers carried by the stud 63 and the corresponding cams are rotated somewhat over ninety degrees in a direction the reverse to that imparted to the cams by operation of the rollers 61 and 61ª, which operation moves the rods 48 outwardly to clamping position. Upon the release of the rods 48 by the operation of the rollers 61 and 61ª, the rods which have been milled are released and either dropped from the machine by gravity or may readily be removed by the operator and blanks to be milled are inserted in their place ready for engagement by the clamping surfaces when the rods are moved by the head 29 to operate the cams arms 60 and 60ª. The clamping of the blanks in place by the automatic means described occurs sufficiently before the blanks engage the milling cutters so that the blanks are positively held in proper position for the milling operation, which condition continues sufficiently after the milling operation is completed to insure that the work on the blanks has been done, at which time they are released as described. A chute 74 is preferably provided to receive the chips from the milling cutters and deliver the same from the machine.

Figure 3:
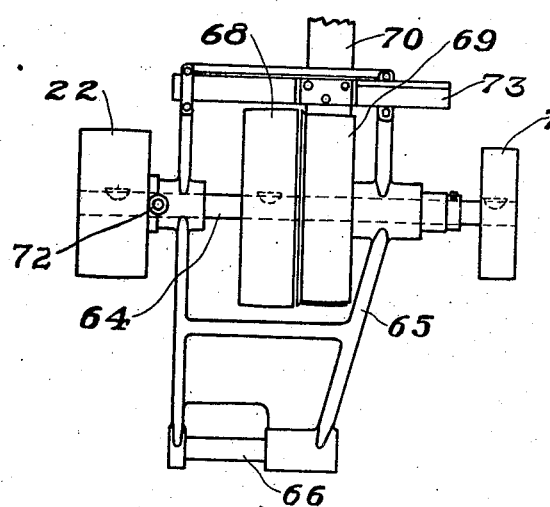
Fig. 3 is an elevation to a reduced scale of the pulley mechanism and its support used to drive the machine.
Figure 4:
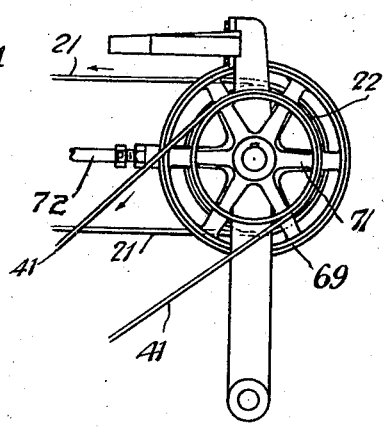
Fig. 4 is a view taken from the right hand of the parts shown in Fig. 3.

As indicated in Figs. 3 and 4, the pulley mechanism employed to drive the spindle 18 and the pulley 40 consists of a countershaft 64 mounted in a frame 65 the lower end of which is supported on a rod or bar 66, which, as shown in Fig. 1 is carried by a suitable bracket 67 from the housing 11 of the machine. The shaft 64 carries tight and loose pulleys 68 and 69 respectively for engagement with the main driving belt 70, and to the ends of the shaft 64, the pulleys 22 and 71 are rigidly secured to drive respectively the belts 21 and 41. The upper portion of the frame 65 is held in desired position relatively to the housing 11 by a strut 72 having threaded engagement at its ends with the frame and housing by which the frame may be moved on the rod 66 to tighten the belts 21 and 41 as desired. Suitable shifting mechanism 73 is provided for moving the belt 70 from one of the pulleys 68 and 69 to the other, to start and stop the machine as desired.

While I have shown my invention in the particular embodiment above described, I do not however, limit myself to this exact construction, as I may employ modifications thereof known to the art at the time of the filing of this application without departing from the scope of the appended claims.

What I claim is:

1. In a machine of the class described, the combination of a base, a revolvable head carried by the base, devices for clamping parts to be milled to said head with their axes at right angles to the axis of said head, a milling spindle parallel with the axis of said head and eccentrically disposed thereto for milling the projecting ends of said parts to be milled, said clamping devices comprising movable rods carried by said head, clamping blocks on one end of said head for engaging said parts to be milled, and cam mechanism engaging said rods on the other end of said head for moving said rods to clamping position, said cam mechanism comprising a cam plate carried by said head for each of said rods, a cam rotatably mounted on each rod engaging the corresponding cam plate, arms projecting from each cam, and rollers carried by the base in the path of said arms, one of said rollers being outside of and the other inside of said cams radially, whereby rotation of said head brings the arms of each cam alternately into engagement with said rollers to alternately rotate the cam in one direction and then the other to its clamping and releasing positions.

2. In a machine of the class described, the combination of a base, a revolvable head carried by the base, devices for clamping parts to be milled to said head with their axes at right angles to the axis of said head, a milling spindle parallel with the axis of said head and eccentrically disposed thereto for milling the projecting ends of said parts to be milled, said clamping devices comprising movable rods carried by said head, clamping blocks on one end of said head for engaging said parts to be milled, cam mechanism engaging said rods on the other end of said head for moving said rods to clamping position, said cam mechanism comprising a cam plate carried by said head for each of said rods, a cam rotatably mounted on each rod engaging the corresponding cam plate, arms projecting from each cam, and rollers carried by the base in the path of said arms, one of said rollers being outside of and the other inside of said cams radially, whereby rotation of said head brings the arms of each cam alternately into engagement with said rollers to alternately rotate the cam in one direction and then the other to its clamping and releasing positions, and a spring for moving each rod to releasing position when its cam mechanism is released.

3. In a machine of the class described, the combination of a base, a revolvable head carried by the base, devices for clamping parts to be milled to said head with their axes at right angles to the axis of said head, a milling spindle parallel with the axis of said head and eccentrically disposed thereto for milling the projecting ends of said parts to be milled, said clamping devices comprising movable rods carried by said head, clamping blocks on one end of said head for engaging said parts to be milled, cam mechanism engaging said rods on the other end of said head for moving said rods to clamping position and a block carried by each rod adjacent said clamping blocks and having opposite beveled edges, whereby each rod in its clamping position holds two of the parts to be milled between the beveled edges of its clamping block and the adjacent clamping blocks on said head.

5. In a machine of the class described, the combination of a base, a revolvable head carried by the base, devices for clamping parts to be milled to said head with their axes at right angles to the axis of said head, a milling spindle parallel with the axis of said head and eccentrically disposed thereto for milling the projecting ends of said parts to be milled, said clamping devices comprising movable rods carried by said head, clamping blocks on one end of said head for engaging said parts to be milled, cam mechanism engaging said rods on the other end of said head for moving said rods to clamping position, a block carried by each rod adjacent said clamping blocks and having opposite beveled edges, whereby each rod in its clamping position holds two of the parts to be milled between the beveled edges of its clamping block and the adjacent clamping blocks on said head, and a spring for moving each rod and its clamping block to releasing position when its cam mechanism is released.

5. In a machine of the class described, the combination of a base, a revolvable head carried by the base, devices for clamping parts to be milled to said head with their axes at right angles to the axis of said head, a milling spindle parallel with the axis of said head and eccentrically disposed thereto for milling the projecting ends of said parts to be milled, said clamping devices comprising movable rods carried by said head, clamping blocks on one end of said head for engaging said parts to be milled, and cam mechanism engaging said rods on the other end of said head for moving said rods to clamping position, said cam mechanism comprising a cam plate carried by said head for each of said rods, a cam rotatably mounted on each rod engaging the corresponding cam plate, arms projecting from each cam, the arms of alternate cams being in a first plane and the arms of intermediate cams being in a second plane parallel with said first plane, whereby the arms of said alternate cams clear the arms of said intermediate cams when any of said arms are operated, and two pairs of rollers carried on opposite sides of the base, one pair being outside of and the other pair inside of said cams radially, one roller of each pair being in said first plane and the other roller of each pair being in said second plane, whereby rotation of said head brings the cam arms of successive cams successively into engagement with the rollers of one pair and subsequently successively into engagement with the rollers of the other pair, to alternately move each cam to is clamping and releasing positions, the rollers of each pair being alternately engaged by said arms.

6. In a machine of the class described, the combination of a base, a revolvable head carried by the base, devices for clamping parts to be milled to said head with their axes at right angles to the axis of said head, a milling spindle parallel with the axis of said head and eccentrically disposed thereto for milling the projecting ends of said parts to be milled, said clamping devices comprising movable rods carried by said head, clamping blocks on one end of said head for engaging said parts to be milled, cam mechanism engaging said rods on the other end of said head for moving said rods to clamping position, said cam mechanism comprising a cam plate carried by said head for each of said rods, a cam rotatably mounted on each rod engaging the corresponding cam plate, arms projecting from each cam, the arms of alternate cams being in a first plane and the arms of intermediate cams being in a second plane parallel with said first plane, whereby the arms of said alternate cams clear the arms of said intermediate cams when any of said arms are operated, and two pairs of rollers carried on opposite sides of the base, one pair being outside of and the other pair inside of said cams radially, one roller of each pair being in said first plane and the other roller of each pair being in said second plane, whereby rotation of said head brings the cam arms of successive cams successively into engagement with the rollers of one pair and subsequently successively into engagement with the rollers of the other pair, to alternately move each cam to its clamping and releasing positions, the rollers of each pair being alternately engaged by said arms, and a spring around each rod for moving it to releasing position when its cam mechanism is in releasing position.

7. In a machine of the class described, the combination of a base, a revolvable head carried by the base, devices for clamping parts to be milled to said head with their axes at right angles to the axis of said head, a milling spindle parallel with the axis of said head and eccentrically disposed thereto for milling the projecting ends of said parts to be milled, said clamping devices comprising movable rods carried by said head, clamping blocks on one end of said head for engaging said parts to be milled, cam mechanism engaging said rods on the other end of said head for moving said rods to clamping position, a block carried by each rod adjacent said clamping blocks and having opposite beveled edges, whereby each rod in its clamping position holds two of the parts to be milled between the beveled edge of its clamping block and the adjacent clamping blocks on said head, and said cam mechanism comprising a cam plate carried by said head for each of said rods, a cam rotatably mounted on each rod engaging the corresponding cam plate, arms projecting from each cam, the arms of alternate cams being in a first plane and the arms of intermediate cams being in a second plane parallel with said first plane, whereby the arms of said alternate cams clear the arms of said intermediate cams when any of said arms are operated, and two pairs of rollers carried on opposite sides of the base, one pair being outside of and the other pair inside of said cams radially, one roller of each pair being in said first plane and the other roller of each pair being in said second plane, whereby rotation of said head brings the cam arms of successive cams successively into engagement with the rollers of one pair and subsequently successively into engagement with the rollers of the other pair, to alternately move each cam to its clamping and releasing positions, the rollers of each pair being alternately engaged by said arms.

8. In a machine of the class described, the combination of a base, a revolvable head carried by the base, devices for clamping parts to be milled to said head with their axes at right angles to the axis of said head, a milling spindle parallel with the axis of said head and eccentrically disposed thereto for milling the projecting ends of said parts to be milled, a counter shaft, gearing for driving said head, a second shaft for driving said gearing, driving connections between said counter shaft and said spindle and second shaft, a frame carried by the base supporting said counter shaft, and a strut of changeable length between base and frame for tightening said driving connections as desired.

In witness whereof, I hereunto subscribe my name this 17th day of August, A. D. 1920.

ARTHUR R. FORS.